US008591170B1

(12) United States Patent
Rawls

(10) Patent No.: US 8,591,170 B1
(45) Date of Patent: Nov. 26, 2013

(54) DIRECTED FORCE TURBINE DEVICE

(76) Inventor: James D. Rawls, Riley, MI (US)

(*) Notice: Subject to any disclaimer, the term of this patent is extended or adjusted under 35 U.S.C. 154(b) by 837 days.

(21) Appl. No.: 12/788,189

(22) Filed: May 26, 2010

(51) Int. Cl.
F03D 7/06 (2006.01)

(52) U.S. Cl.
USPC ......... 415/4.2; 415/4.1; 415/53.2; 415/211.1; 416/197 A

(58) Field of Classification Search
USPC ......... 415/2.1, 4.2, 4.4, 53.2, 58.2, 58.4, 191, 415/203, 211.1; 416/197 A; 290/3.1, 44, 55
See application file for complete search history.

(56) References Cited

U.S. PATENT DOCUMENTS

| | | | |
|---|---|---|---|
| 4,047,834 A * | 9/1977 | Magoveny et al. | 415/53.1 |
| 4,293,274 A * | 10/1981 | Gilman | 416/51 |
| 4,792,700 A * | 12/1988 | Ammons | 290/55 |
| 5,009,569 A * | 4/1991 | Hector et al. | 415/4.1 |
| 5,664,418 A * | 9/1997 | Walters | 60/398 |
| 5,743,712 A * | 4/1998 | Aylor | 416/42 |
| 6,158,953 A * | 12/2000 | Lamont | 415/4.4 |
| 6,206,635 B1 * | 3/2001 | Golm et al. | 415/209.1 |
| 6,309,172 B1 * | 10/2001 | Gual | 415/4.4 |
| 6,655,907 B2 * | 12/2003 | Brock et al. | 415/4.2 |
| 6,740,989 B2 | 5/2004 | Rowe | |
| 6,870,280 B2 * | 3/2005 | Pechler | 290/55 |
| 7,329,965 B2 * | 2/2008 | Roberts et al. | 290/55 |
| D587,196 S | 2/2009 | Chong | |
| 7,521,816 B2 * | 4/2009 | Helfrich | 290/54 |
| 2004/0100103 A1 | 5/2004 | Becherucci et al. | |

* cited by examiner

Primary Examiner — Edward Look
Assistant Examiner — Aaron R Eastman

(57) ABSTRACT

A directed force turbine device utilizing forces of wind or water current flow featuring a wheel-style rotor assembly having side panels connected via a plurality of curved vanes, the rotor assembly rotates on bearings about a fixed axle shaft, the curved vanes harness the incoming current flow, which drives rotation of the rotor assembly, the vanes surround the fixed axle shaft and form an inner cavity; a stator assembly disposed in the inner cavity of the rotor assembly, the stator assembly does not rotate with the rotor assembly, the stator assembly comprises flow directors wherein entering current flow is directed in between the flow directors which functions to apply a positive force against forward moving vanes of the rotor assembly; a funnel assembly and external flow director for controlling intake of the current flow; and an exhaust port.

5 Claims, 12 Drawing Sheets

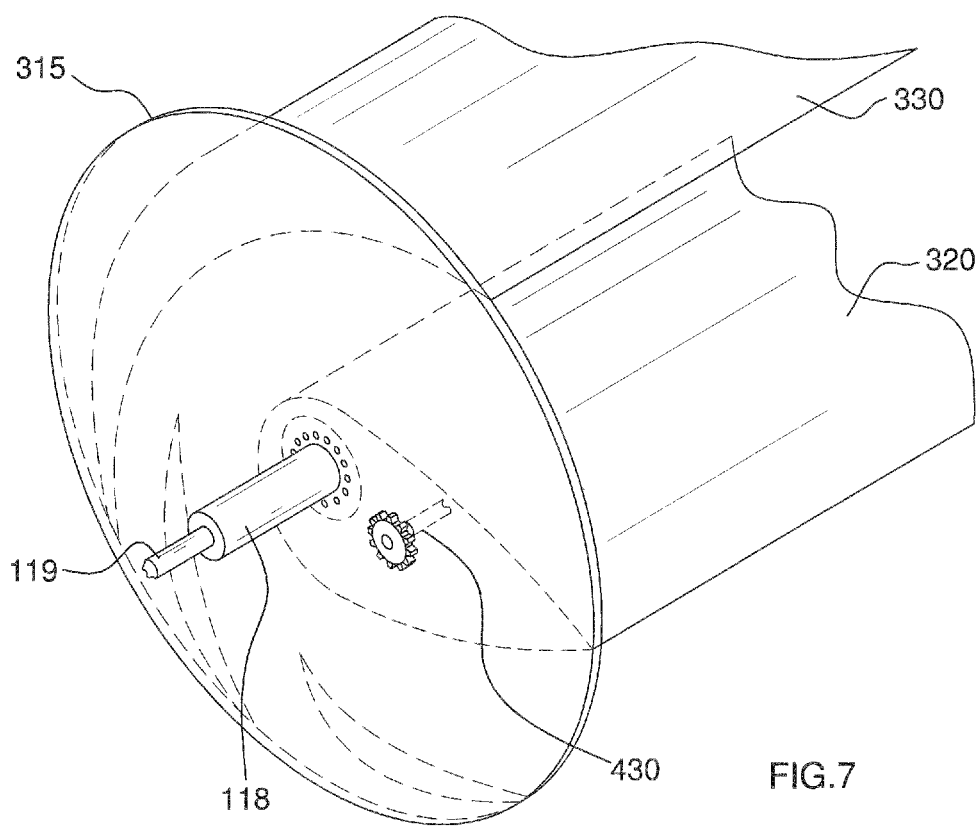

DIRECTED FORCE TURBINE DEVICE

FIELD OF THE INVENTION

The present invention is directed to an energy generator system, more particularly to a wind and/or water turbine-like device.

BACKGROUND OF THE INVENTION

Wind and water have long been as a source of energy that has been used to generate power. The present invention features a novel directed force (wind and water) turbine device. The present invention may be utilized for the production of energy by one of two methods. When constructed for above ground use the turbine utilizes wind as its power source. When constructed as a submersible device, the turbine harnesses the energy imparted by the flow of water to produce power.

The present invention features a directed force turbine device for wind or water. The turbine device comprises a wheel-style rotor having a first circular side panel and a second circular side panel connected via multiple curved vanes. The rotor rotates on bearings about a fixed axle shaft, wherein a plurality of curved vanes span from the first circular side panel to the second circular side panel, the vanes being curved to harness the incoming wind or water currents which drives the rotation of the rotor. The vanes surround a stator assembly, which is disposed in the inner cavity of the rotor assembly. The stator assembly does not rotate with the rotor and is solidly mounted to the fixed axle shaft segments that protrude out either side of the stator assembly. The stator assembly comprises support panels on which the axle shaft segments, jackshaft (if applicable), a teardrop-shaped inner flow director, and a curved wing-like outer flow director and additional flow director vanes are all mounted. Entering wind or water current traveling between the inner and outer flow directors will cause a reversal of the current flow direction. This reversal of the flow direction is now applied to the forward moving vanes on the lower half of the rotor assembly to drive the rotor with a positive force from inside of the rotor assembly. This current flow from the stator assembly as it leaves the rotor vanes is expelled into an exhaust port, which is ducted in such a way as to again change the direction of the wind or water current back to its original direction. A flow separator is positioned just below the forward moving vanes of the rotor assembly to prevent the exhaust flow from coming into contact with the rotor vanes. At the intake portion of the turbine device, the wind or water travels through the funnel assembly and through the external flow director to the rotor, wherein the wind or water current either (i) is harnessed by the vanes and pushes the vanes to drive the rotation of the rotor (then subsequently exits the rotor out the rear of the turbine); or (ii) is directed through the vanes onto the backside of the outer flow director portion of the stator assembly and then is harnessed by the vanes, once again, to drive rotation of the rotor then subsequently exits the rotor out the rear of the turbine.

In some embodiments, the external flow director is constructed so that the front (intake) end is positioned above and forward of the rotor about equal to a radial length of the rotor itself. The rear (discharge) end of the external flow director is positioned just above the rotor vanes at approximately two thirds (⅔) the distance back from the support axle to the rear edge of the rotor. In some embodiments, the external flow director comprises side panels to ensure all available current flow is applied to the rotor assembly. In some embodiments, the inner flow director has a leading tapered edge positioned at a height equal to or just below the upper edge of the deflector shield. In some embodiments the stator assembly comprises support panels on which the axle segments, jackshaft (if applicable), inner flow director, outer flow director, and director vanes are securely mounted. In some embodiments, a flow separator is positioned just below the rotor vanes. The flow separator helps direct the wind or water current flow into an exhaust port as well as preventing the exhausted flow from coming into contact with the rotor vanes as it exits the turbine. In some embodiments, the flow separator is suspended from the axle to allow it to be rotated forward to close off the turbine intake opening to permit speed regulation of the rotor. In some embodiments, the rotor is operatively connected to a generator, compressor, pump, or any other device in need of a power source. In some embodiments, drive gears, sprockets, or pulleys attached to each side of the rotor are operatively connected to a common jackshaft either within the stator assembly or external of the rotor assembly. In some embodiments, the jackshaft is operatively connected via gears, sprockets, or pulleys to an output power drive shaft. Or, if mounted external of the rotor assembly, the jackshaft itself may be used as the power drive shaft. In some embodiments, the output power drive shaft runs through the inside of the fixed support axle. In some embodiments, the rotor assembly comprises closed side panels.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

Briefly, the present invention features a directed force turbine device utilizing forces of wind or water current flow. In some embodiments, the directed force turbine device comprises a fixed axle shaft; a wheel-style rotor assembly having a first circular side panel and a second circular side panel connected via a plurality of curved vanes that span from the first circular side panel and the second circular side panel, the rotor assembly rotates on bearings about the fixed axle shaft, the curved vanes harness the incoming wind or water current flow, which drives rotation of the rotor assembly, the vanes surround the fixed axle shaft and form an inner cavity; a stator assembly disposed in the inner cavity of the rotor assembly and fluidly connected to the rotor assembly, the stator assembly does not rotate with the rotor assembly, the stator assembly comprises fixed shafts protruding out from and rigidly attached to the support panels; and a teardrop-shaped inner flow director, a curved outer flow director, and small flow director vanes which are also mounted to the support panels, wherein entering wind or water current flow is directed in between the inner flow director and outer flow director to reverse direction of the wind or water current flow which functions to apply a positive force against the forward moving vanes of the rotor assembly to aid in driving rotation of the rotor assembly; a funnel assembly fluidly connected to the rotor assembly, the funnel assembly funnels wind or water current flow outside of the rotor assembly intake area and forces wind or water current flow into the intake area of the rotor assembly, thereby helping to increase the speed of the wind or water current flow, wherein the funnel assembly comprises a sloped deflector shield positioned at a bottom area of the funnel assembly, the deflector shield functions to help block oncoming wind or water current flow from striking forward moving vanes of the rotor assembly and deflect said oncoming wind or water current flow up and into the intake area of the rotor assembly; an external flow director disposed above the rotor assembly and fluidly connected to both the rotor assembly and to the funnel assembly, wherein wind or water current flowing through the funnel assembly is captured by the external flow director and further forced against the rotor assembly, wherein the wind or water flow either (i) is harnessed by the vanes of the rotor assembly to drive rotation of the rotor assembly or (ii) passes through the vanes to the backside of the outer flow director portion of the stator assembly and is then harnessed by the vanes to drive rotation of the rotor assembly, wherein the external flow director holds the wind or water current flow against an upper half of the rotor assembly and the stator assembly forces said flow against a lower half of the rotor assembly; an exhaust port fluidly connected to the rotor, wherein wind or water current flow from the stator assembly or vanes exits the rotor assembly via the exhaust port, the exhaust port reverses flow direction of said wind or water current flow to its original flow direction; and a flow separator disposed optionally just beneath the rotor assembly, the flow separator is a curved panel which directs wind or water flow from the rotor assembly to an exhaust port and helps prevent the wind or water flow from coming in contact with the rotor assembly when the wind or water flow is flowing through the exhaust port.

In some embodiments, an intake end of the external flow director is positioned a distance above and forward of the rotor, the distance being about equal to a radial length of the rotor. In some embodiments, a discharge end of the external flow director is positioned above the vanes. In some embodiments, the inner flow director has a teardrop shaped segment that has a leading tapered edge positioned at a height about equal to or just below an upper edge of the deflector shield. In some embodiments, the stator assembly comprises support panels, the support panels provide mounting support for components of the stator assembly, wherein the support panels are an integral part of the fixed axle shaft. In some embodiments, the side panels of the rotor assembly are operatively connected to a jackshaft, the jackshaft being operatively connected to a power output shaft for driving a generator or other device requiring a power source.

BRIEF DESCRIPTION OF THE DRAWINGS

FIG. 7 is a partial view of the stator assembly showing component mounting location to support panel.

DESCRIPTION OF PREFERRED EMBODIMENTS

Figure 1:
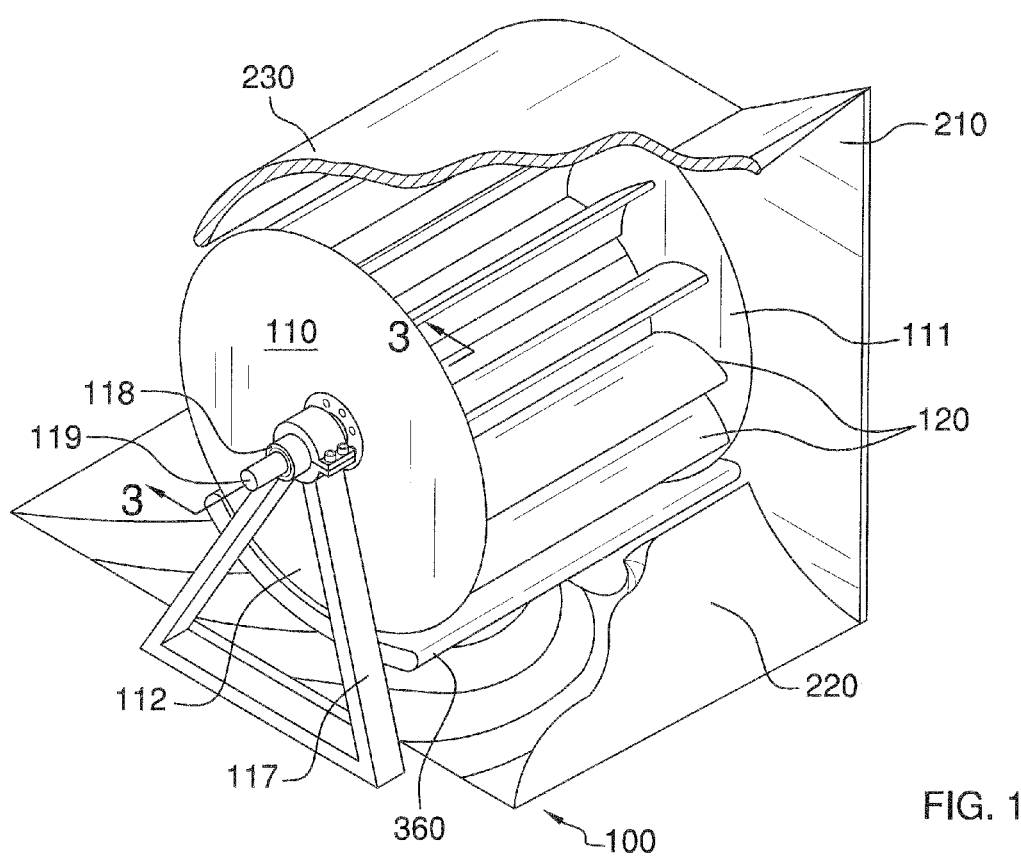
FIG. 1 is a first perspective view and internal view of the directed force turbine device of the present invention.

Referring now to FIG. 1-8, the present invention features a directed force turbine device 100. The directed force turbine device 100 of the present invention comprises a rotor 110 that spins about an axis, a deflector shield 220, funnel assembly 210, and external flow director 230 that together can direct wind or water current flow into the rotor 110. The directed force turbine device 100 further comprises a stator assembly 310, a flow separator 360, and an exhaust port 350. Without wishing to limit the present invention to any theory or mechanism, it is believed that the device 100 of the present invention is advantageous because the vanes/wheel part of the device is the only part that rotates; the stator assembly 310 and fixed shaft remain stationary, for example.

The rotor 110 may be constructed in a variety of shapes and sizes, for example as shown in FIG. 1 the rotor is generally cylindrical having a first side panel 111 (e.g., circular) and a second side panel 112 (e.g., circular). The side panels 111, 112 are connected by the vanes 120. The rotor 110 rotates about the fixed axle shaft 118 on bearings. Spanning the first side panel 111 and the second side panel 112 is a plurality of vanes 120 (e.g., curved vanes), for example the first ends of the vanes 120 are attached to the first side panel 111 and the second ends of the vanes 120 are attached to the second side panel 112. The vanes 120 are generally parallel to the fixed axle shaft 118. The vanes 120 surround the fixed axle shaft 118 and form an inner cavity. The sides of the vanes 120 are completely enclosed; flow cannot leave from sides of the vanes 120.

Figure 2:
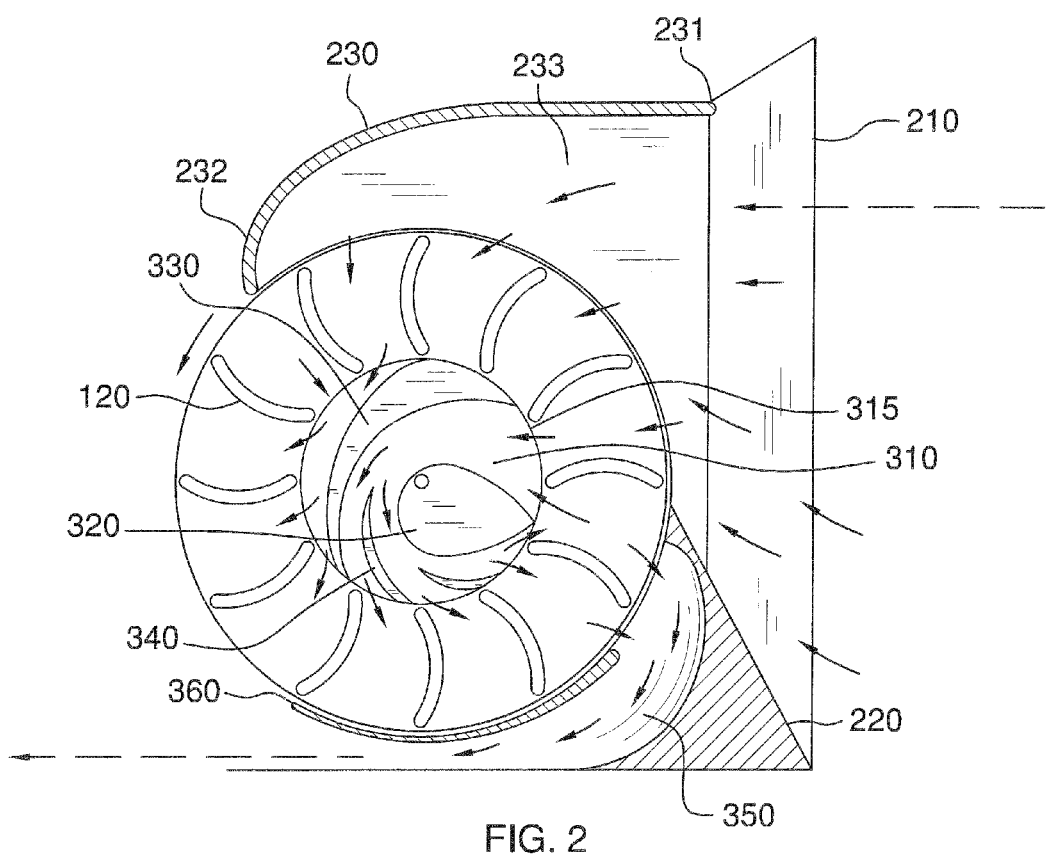
FIG. 2 is a first cross sectional view of the directed force turbine device of the present invention.

As shown in FIG. 1 and FIG. 2, wind or water current flow can be directed to the rotor 110 via a funnel assembly 210 (e.g., which functions as a funnel). In some embodiments, a deflector shield 220 is disposed in the funnel assembly 210, which can function to help direct wind or water current flow through the funnel assembly 210. For example, the deflector shield 220 may function to shape a portion of the funnel assembly 210 in a desired manner for optimal intake of the wind or water current flow. In some embodiments, the deflector shield 220 is a tapered (e.g., inversely) sloping surface. In some embodiments, the deflector shield 220 may redirect the wind or water current flow that is below the horizontal centerline of the rotor to a point above this line (e.g., see FIG. 2, wherein wind or water current flow at the lower half of the rotor 110 is deflected upwardly into the funnel assembly 210 via the deflector shield 220). In some embodiments, the deflector shield 220 blocks the oncoming flow of wind or water from striking the forward moving vanes 120 on the bottom half of the rotor 110. In some embodiments, the deflector shield 220 helps to force the flow of wind or water current in an upward and inward direction. In some embodiments, the funneling function of the funnel assembly 210 harnesses the flow that would be outside of the rotor assembly intake area and directs it into the rotor assembly 110. This may help increase the speed of the flow, which improves efficiency.

From the funnel assembly 210 and deflector shield 220, wind or water current flow travels to the rotor 110, in some embodiments through an external flow director 230. The external flow director 230, with its side panels 233, can function as a duct so as to prevent the wind or water current flow from escaping, thus, the flow continues to the rotor 110. In some embodiments, the external flow director 230 is the same width as the rotor 110 assembly. In some embodiments, the external flow director 230 is positioned above the rotor 110 and fluidly connects the funnel assembly 210 (and deflector shield 220) to the rotor 110. In some embodiments, the external flow director 230 is positioned so that the front (intake) end is located above and forward of the rotor 110 at a distance about equal to the radial length of the rotor 110. The external flow director 230 has a front (intake) end 231 fluidly connected to the funnel assembly 210 (and deflector shield 220) and a rear (discharge) end 232 that may curve downwardly to the rotor 110. The rear (discharge) end 232 of the external flow director 230 may terminate just at a point above the rotor 110. The side panels 233 of the external flow director 230 extend from the top surface of the external flow director 230 downwardly to but not touching the circular side panels of the rotor 110. These side panels 233 also extend rearward from the funnel assembly 210 to the rear (discharge) end 232 of the external flow director 230. The external flow director 230 may compress and/or direct the flow of the wind or water current that is above the rotor 110 (see FIG. 2) into and in some cases past the vanes 120 to the inner cavity of the rotor 110 assembly. In this way, the external flow director 230 can help capture a portion of the deflected flow and force it back to the rotor 110 (e.g., for accelerating the speed of the flow).

As the wind or water flow is directed to the rotor 110, the vanes 120 (e.g., vanes with curvatures) capture the wind or water current flow and the rotor 110 is forced to rotate about the fixed axle shaft 118. In some embodiments, the wind or water flow can pass the vanes 120 and enter into the inner cavity of the rotor 110 assembly.

Disposed in the inner cavity of the rotor 110 is a stator assembly 310. The stator assembly 310 does NOT rotate with the rotor 110, but in actuality constitutes the entire axle itself (fixed axle shaft 118). Wind or water current flow that passes the vanes 120 enters into the stator assembly 310, which directs the flow in a way that actually reverses its direction. This reversed flow can now be applied to the forward moving vanes 120 at the bottom half of the rotor 110 to produce additional rotational force. In some embodiments, the stator assembly 310 allows force to be applied to all of the vanes 120 of the rotor 110 at the same time. Without wishing to limit the present invention to any theory or mechanism, it is believed that the stator assembly 310 is advantageous because it can help increase the efficiency of the turbine device 100.

Figure 1A:
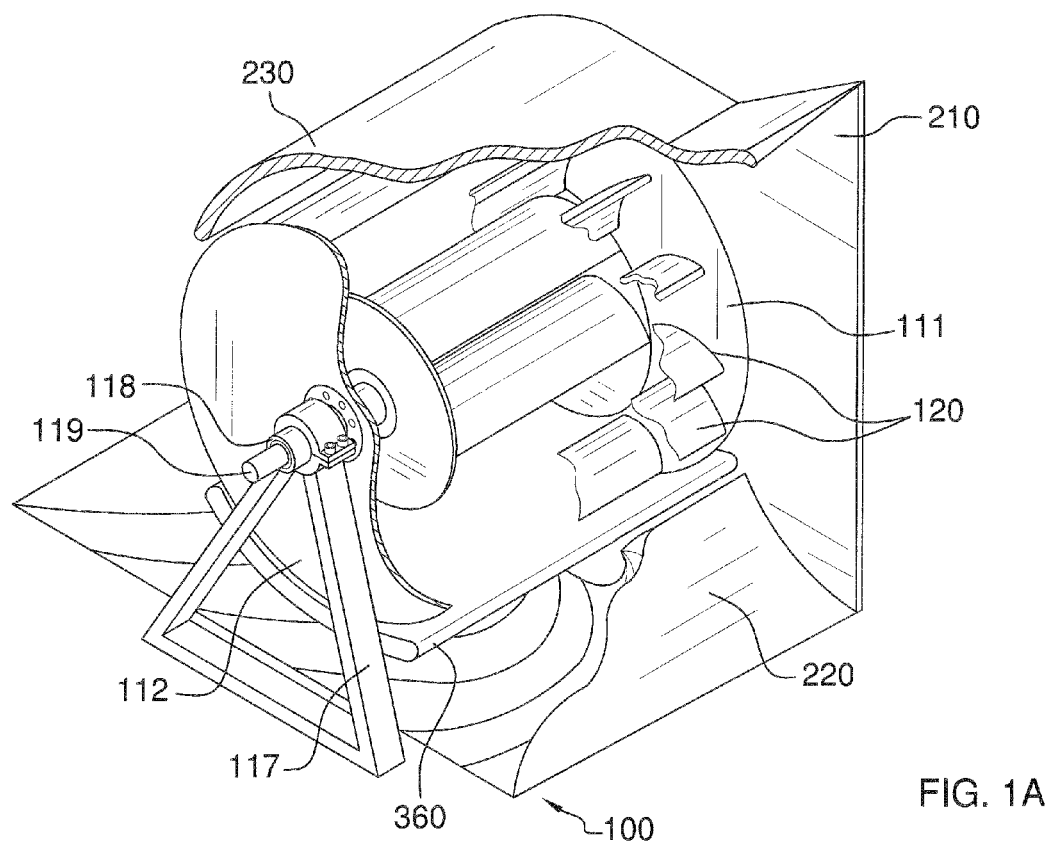
FIG. 1A is a perspective and cutaway view of the device of FIG. 1.
Figure 1B:
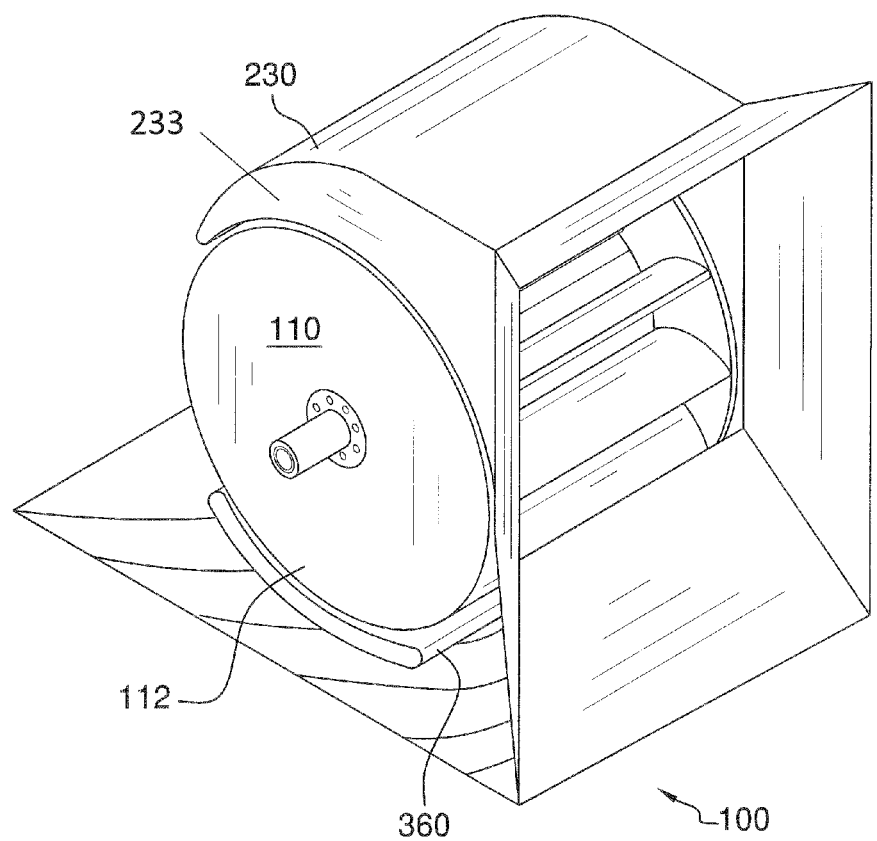
FIG. 1B is a second perspective view of the device of the present invention.
Figure 6:
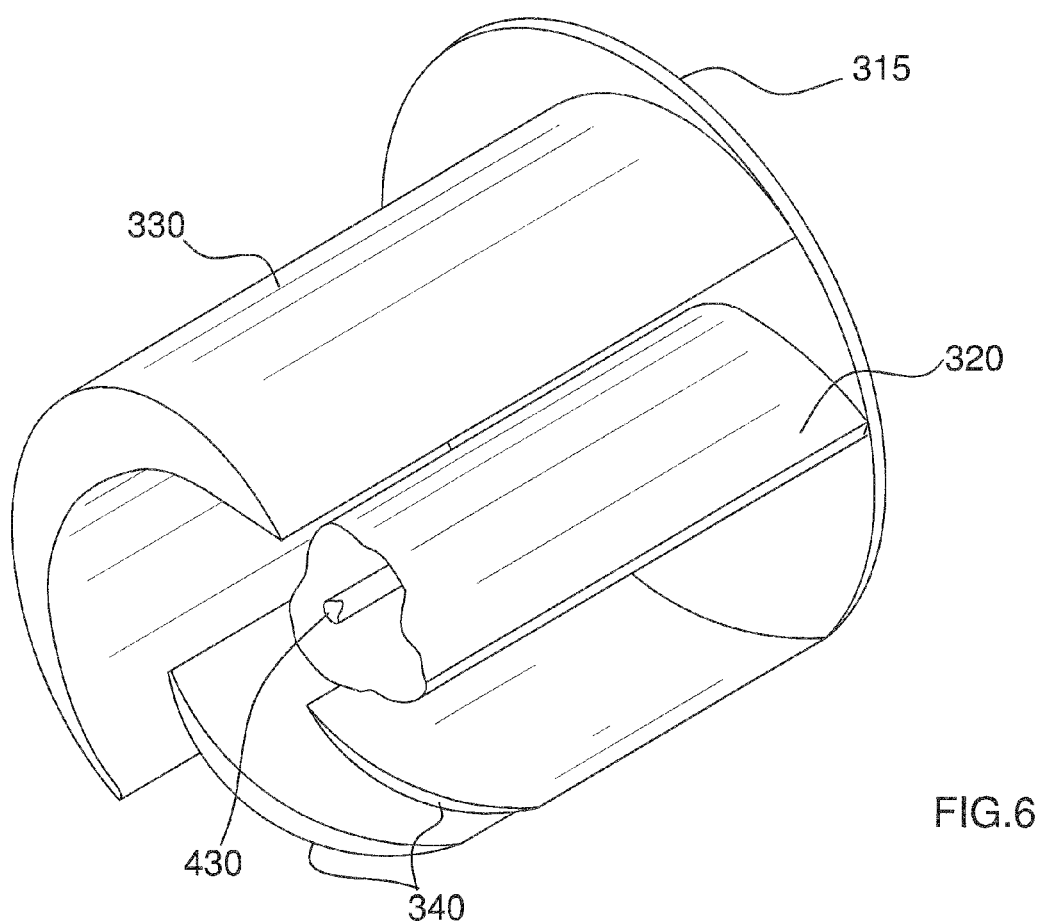
FIG. 6 is a fourth perspective and cutaway view of the stator assembly.
Figure 6A:
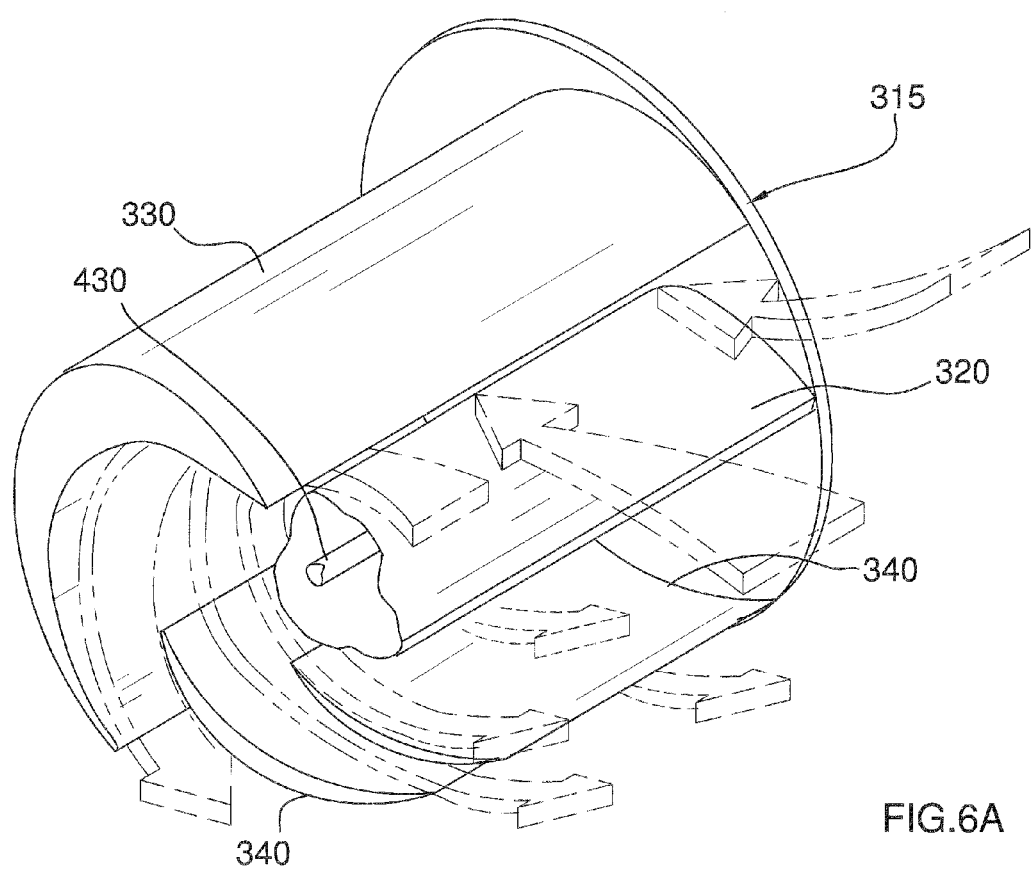
FIG. 6A is a fifth perspective view of the stator assembly of FIG. 6 showing flow direction in and out of the stator assembly.
Figure 8:
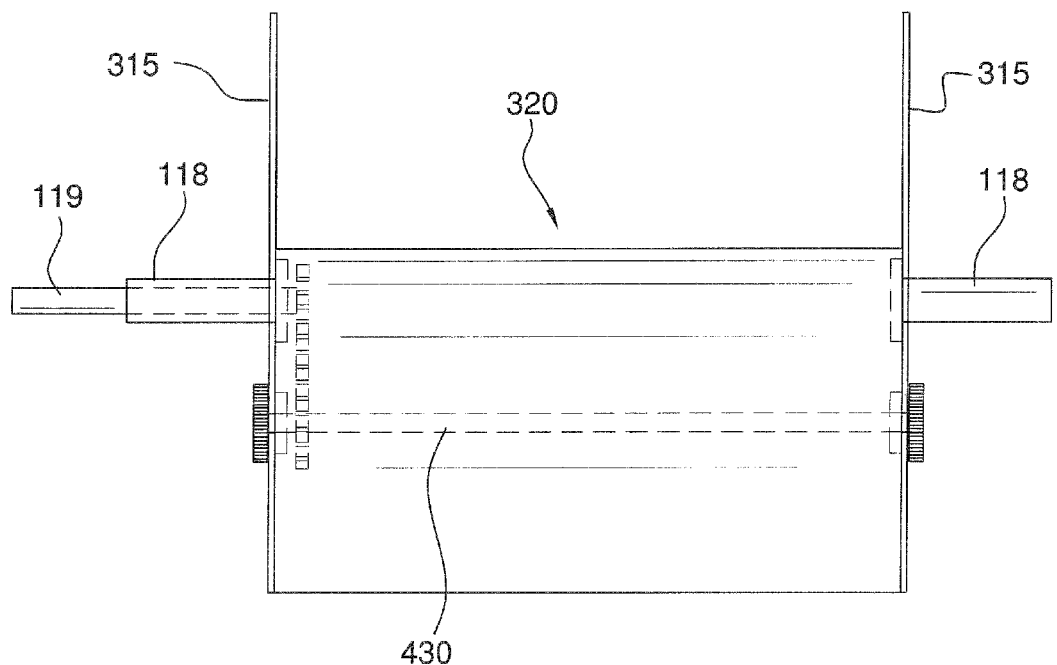
FIG. 8 is a top view of the inner flow director (mounted to support panels).

In some embodiments, the stator assembly 310 (see FIG. 6, FIG. 7, and FIG. 8) is the entire axle for the rotor assembly 110. The stator assembly 310 comprises support panels 315, axle shaft segments 118, a jackshaft (if applicable), an outer flow director 330, an inner flow director 320, and flow director vanes 340 (e.g., a first flow director vane, a second flow director vane). The inner flow director 320 is teardrop-shaped. In some embodiments, the inner flow director 320 has a leading tapered edge, which may be positioned at a height equal to or just below the upper edge of the deflector shield 220 (see FIG. 2). The outer flow director 330 is generally curved with the outer curved portion being irregularly shaped. In some embodiments, the forward one third (⅓) of the outer surface of the outer flow director 330 generally follows the arc created by the inside edges of the rotor vanes 120, but does not touch the passing vanes 120. The remaining two thirds (⅔) of the outer surface of the outer flow director 330, has the curvature of a much larger diameter circle and terminates at the trailing point of termination of the inside surface of the outer flow director 330. This creates a cavity between the rotor vanes 120 and the stator assembly 310. In some embodiments, the inside surface arc of the outer flow director 330 is of a constant radius. At the front opening of the stator assembly 310, wind or water current that passes through the vanes 120 is funneled between the inner flow director 320 and the outer flow director 330, which directs the wind or water flow to reverse its direction (see FIG. 6A). In some embodiments, the flow director vanes 340 function to help direct the now reversed wind or water current flow against the passing vanes 120. This reversal now permits the force to be applied against the forward moving vanes 120 at the bottom half of the rotor 110 (see FIG. 2). In some embodiments, the components of the stator assembly 310 mount to the support panels 315. These support panels 315 have solidly attached fixed axle shafts 118 (see FIG. 3, FIG. 7, and FIG. 8) protruding out one side of each panel that are then clamped into the main support structure 117. These shaft segments 118 make up the axle portion that the rotor assembly 110 mounts to and rotates about (see FIG. 1A and FIG. 3) and the flow separator 360 mounts to and rotates about as well when used for rotor 110 speed control (see FIG. 4, FIG. 4A, and FIG. 5).

Wind or water flow is eventually pushed out of the vanes 120 and into an exhaust port 350. This exhaust port 350 functions to once again reverse the direction of the wind or water flow via a curved duct which channels the wind or water flow out of the rear, the sides, or a combination of both of the directed force turbine device 100. In some embodiments, during normal operation, a flow separator 360 is positioned below the rotor 110, which helps to direct the wind or water flow into the exhaust port 350. The flow separator 360 can help prevent the wind or water flow from escaping the vanes 120 prior to reaching the exhaust port 350. The flow separator 360 also prevents the exhausted flow from coming into contact with the forward moving vanes 120 at the bottom of the rotor 110.

In some embodiments, the flow separator 360 is permanently attached to the support structure 117. In some embodiments, the flow separator 360 is not permanently attached to the support structure 117 but is instead suspended beneath the rotor 110 via counter weighted support arms 370. These support arms 370 are connected to the fixed axle shaft segments 118 between the support structure 117 and the rotor assembly 110 (see FIG. 5). The flow separator 360 and counter weighted support arms 370 are free to rotate about the fixed axle shaft segments 118 allowing the flow separator 360 to be rotated forward and up (see FIG. 4 and FIG. 4A) to close off the main intake opening by blocking the wind from striking the rotor 110 assembly of the directed force turbine device 100 in the event of high wind conditions. The ability to do this with the flow separator 360 allows for speed regulation of the rotor 110 in adverse weather conditions (e.g., the flow separator 360 is an "RPM regulator"). In some embodiments, the flow separator 360 covers about ¼ of the circumference of the rotor 110. In some embodiments, an exhaust port 350 is disposed between the flow separator 360 in its normal (down) position and the deflector shield 220. The exhaust port 350 may connect to a duct that either passes beneath the flow separator 360 or out the sides of the directed force turbine device 100 or a combination of both.

Figure 3:
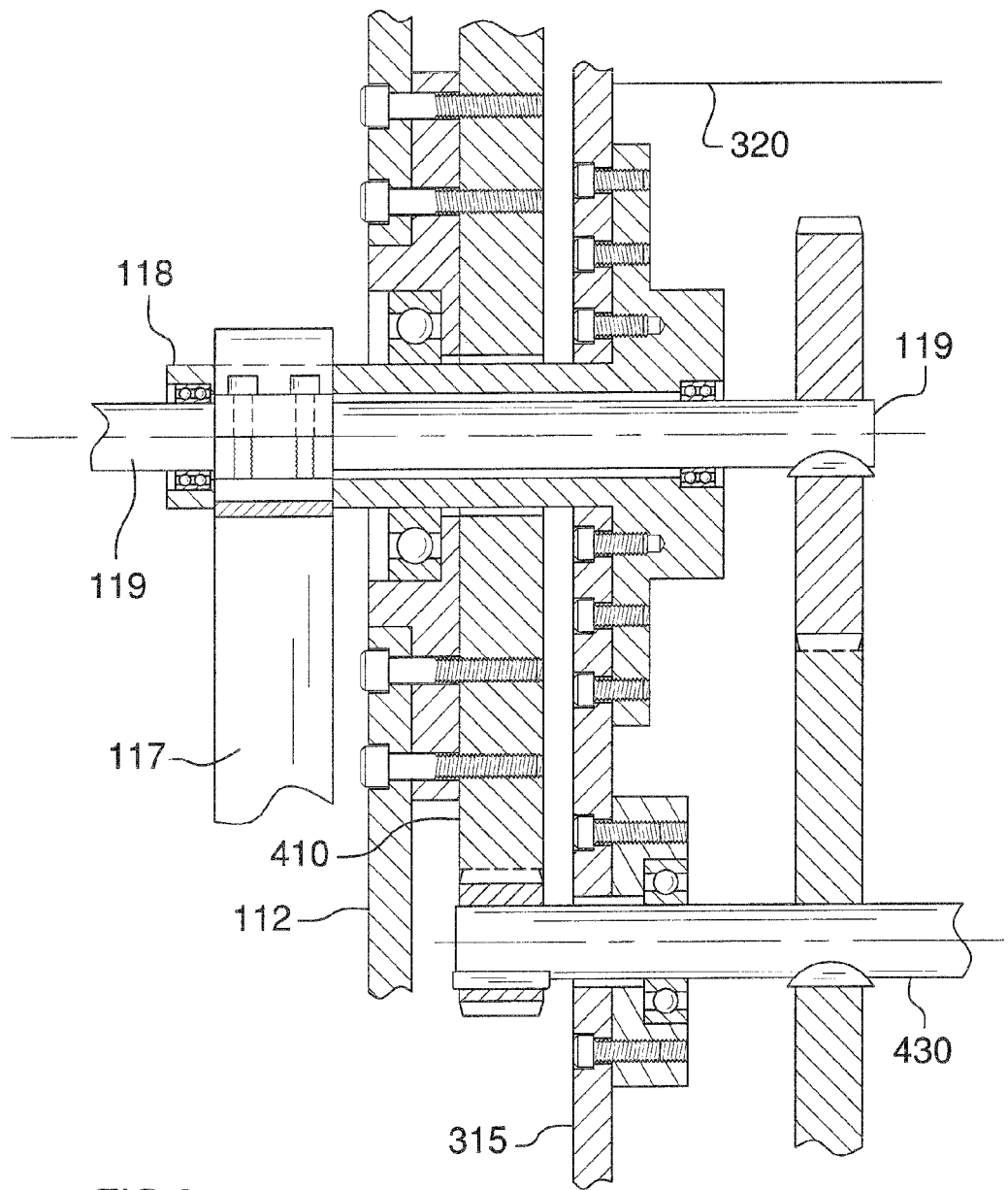
FIG. 3 is a second cross sectional view of the directed force turbine device of FIG. 1.
Figure 4:
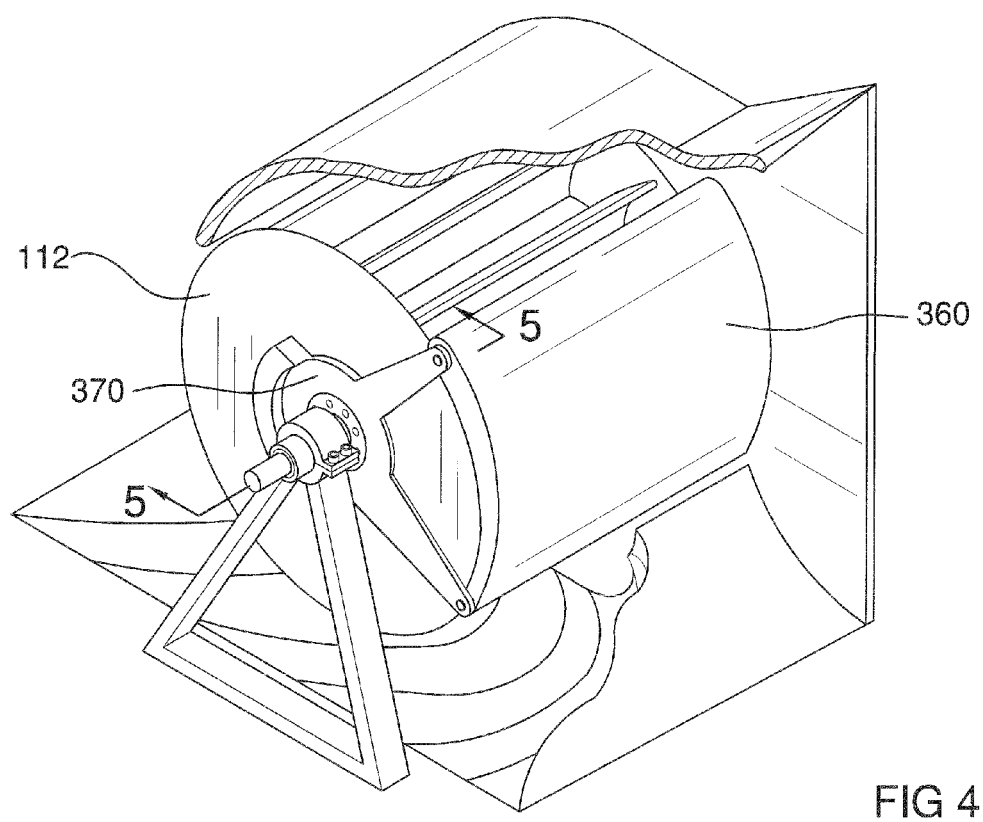
FIG. 4 is a third perspective view of the directed force turbine device of the present invention. This configuration may be used in applications where flow isn't constant or flow is too fast.
Figure 4A:
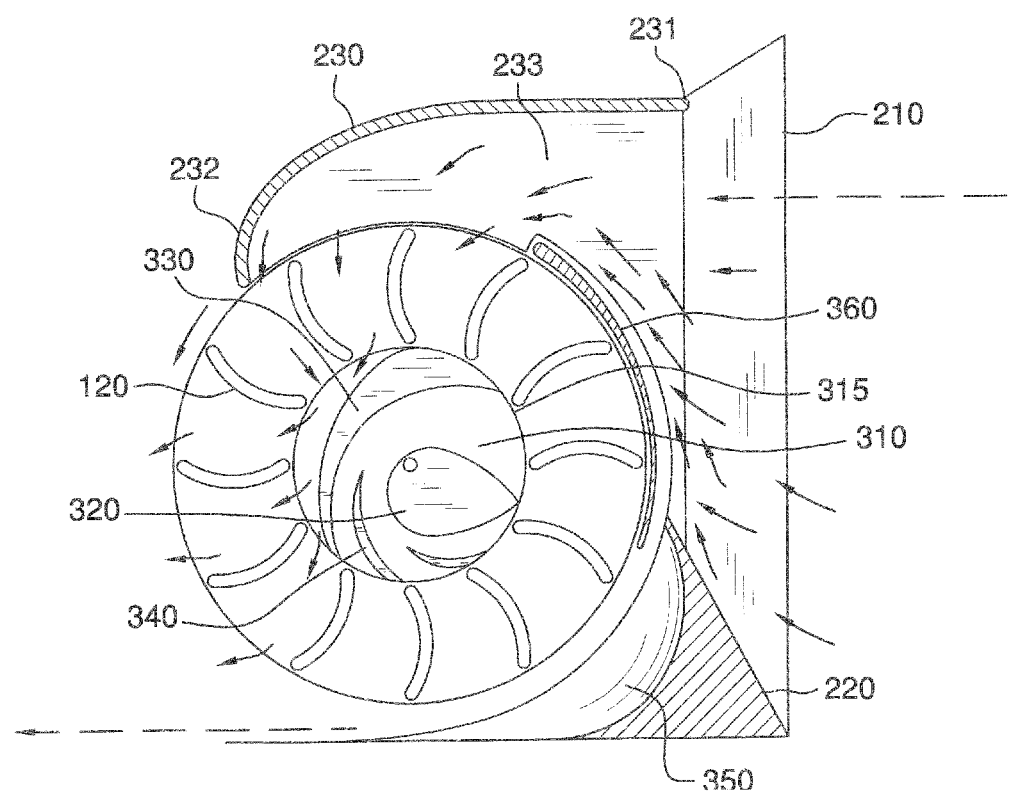
FIG. 4A is a third cross sectional view of the directed force turbine device of the present invention showing the flow separator rotated upwardly for speed regulation of the rotor.
Figure 5:
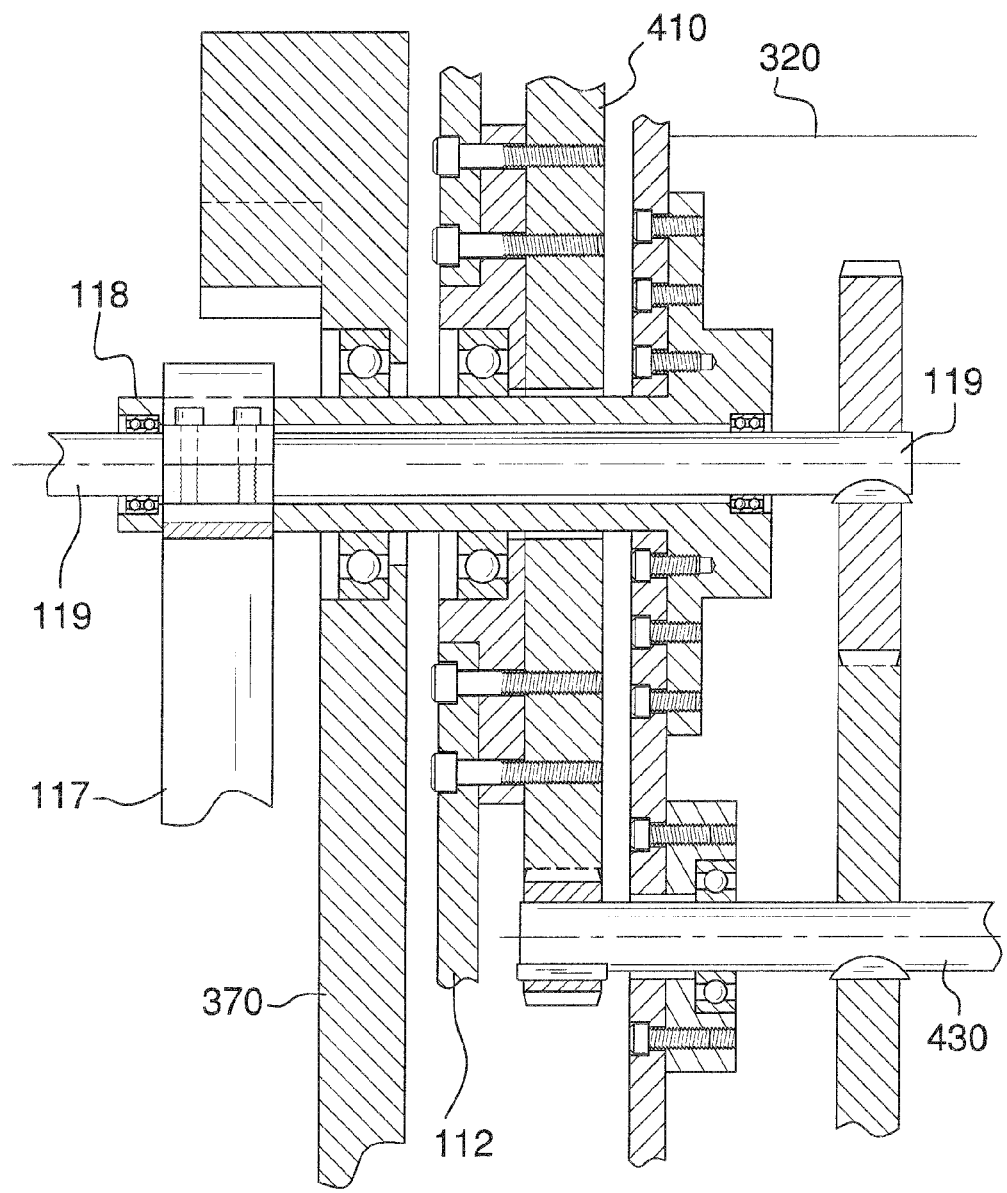
FIG. 5 is a cross sectional view of the directed force turbine device of FIG. 4.

Referring now to FIG. 3, in some embodiments, the power produced by the rotor 110 is operatively connected to a generator, pump, or other device requiring a power source. In some embodiments, gears, sprockets, and/or pulleys are disposed on the rotor 110 (e.g., surrounding the bearings). For example, each side of the rotor 110 is operatively connected to its own drive gear 410. In some embodiments, these drive gears 410 are operatively connected to a jackshaft 430. In some embodiments, the jackshaft 430 is operatively connected to drive gears 410 on both sides of the rotor assembly 110 to prevent a twisting motion of the vanes 120. In some embodiments, the jackshaft 430 is operatively connected to the power output shaft 119. In some embodiments, the power output shaft 119 is operatively connected to a generator or other device requiring a source of power. In some embodiments, the jackshaft itself becomes the power output shaft (e.g., when mounted external of the rotor assembly 110).

The disclosures of the following U.S. Patents are incorporated in their entirety by reference herein: U.S. Pat. No. 6,740,989; U.S. Pat. Application No. 2004/0100103; U.S. Pat. No. 7,329,965; U.S. Pat. No. 6,309,172; U.S. Pat. No. 6,870,280.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A directed force turbine device utilizing forces of wind or water current flow, said directed force turbine device comprising:
   (a) a fixed axle shaft;
   (b) a wheel-style rotor assembly having a first circular side panel and a second circular side panel connected via a plurality of curved vanes that span from the first circular side panel and the second circular side panel, the rotor assembly rotates on bearings about the fixed axle shaft, the curved vanes harness the incoming wind or water current flow, which drives rotation of the rotor assembly, the vanes surround the fixed axle shaft and form an inner cavity;
   (c) a stator assembly disposed in the inner cavity of the rotor assembly and fluidly connected to the rotor assembly, the stator assembly does not rotate with the rotor assembly, the stator assembly comprises:
      (i) two support panels;
      (ii) axle segments protruding out from and rigidly attached to the support panels; and
      (iii) a teardrop-shaped inner flow director having the axle shaft disposed therethrough, a curved outer flow director, and two small flow director vanes which are each mounted to the support panels, wherein entering wind or water current flow is directed in between the inner flow director and outer flow director to reverse direction of the wind or water current flow which functions to apply a positive force against forward moving vanes of the rotor assembly to aid in driving rotation of the rotor assembly;
   (d) a funnel assembly fluidly connected to the rotor assembly, the funnel assembly captures and funnels wind or water current flow outside of the rotor assembly's intake area and guides said current flow into an intake area of the rotor assembly, thereby helping to increase the speed of the wind or water current flow, wherein the funnel assembly comprises a sloped deflector shield positioned at a bottom area of the funnel assembly, the deflector shield functions to help block oncoming wind or water current flow from striking forward moving vanes of the rotor assembly and deflect said oncoming wind or water current flow up and into the intake area of the rotor assembly;
   (e) an external flow director disposed above the rotor assembly and fluidly connected to both the rotor assembly and to the funnel assembly, wherein wind or water current flowing through the funnel assembly is captured by the external flow director and further forced against the rotor assembly, wherein the wind or water flow either (i) is harnessed by the vanes of the rotor assembly to drive rotation of the rotor assembly or (ii) passes through the vanes to a backside of the outer flow director portion of the stator assembly and is then harnessed by the vanes to drive rotation of the rotor assembly, wherein the external flow director holds the wind or water current flow against an upper half of the rotor assembly and the stator assembly forces said flow against a lower half of the rotor assembly;
   (f) an exhaust port fluidly connected to the rotor, wherein wind or water current flow from the stator assembly or vanes exits the rotor assembly via the exhaust port, the exhaust port reverses flow direction of said wind or water current flow to its original flow direction; and
   (g) a flow separator pivotally disposed just beneath the rotor assembly adjacent to the rotor assembly intake area, the flow separator is a curved panel which directs wind or water flow from the rotor assembly to an exhaust port and helps prevent the wind or water flow from coming in contact with the rotor assembly when the wind or water flow is flowing through the exhaust port.

2. The directed force turbine device of claim 1, wherein an intake end of the external flow director is positioned a distance above and forward of the rotor, the distance being about equal to a radial length of the rotor.

3. The directed force turbine device of claim 1, wherein a discharge end of the external flow director is positioned above the vanes.

4. The directed force turbine device of claim 1, wherein the inner flow director has a teardrop shaped segment that has a leading tapered edge positioned at a height about equal to or just below an upper edge of the deflector shield.

5. The directed force turbine device of claim 1, wherein the side panels of the rotor assembly are operatively connected to a jackshaft, the jackshaft being operatively connected to a power output shaft for driving a generator or other device requiring a power source.

* * * * *